(12) United States Patent
Hokazono

(10) Patent No.: US 11,590,808 B2
(45) Date of Patent: Feb. 28, 2023

(54) PNEUMATIC TIRE

(71) Applicant: SUMITOMO RUBBER INDUSTRIES, LTD., Hyogo (JP)

(72) Inventor: Hiroki Hokazono, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 324 days.

(21) Appl. No.: 16/885,856

(22) Filed: May 28, 2020

(65) Prior Publication Data
US 2020/0406687 A1    Dec. 31, 2020

(30) Foreign Application Priority Data

Jun. 25, 2019   (JP) .............................. JP2019-117667

(51) Int. Cl.
| | | |
|---|---|---|
| *B60C 13/02* | (2006.01) | |
| *B60C 13/00* | (2006.01) | |
| *B60C 11/12* | (2006.01) | |

(52) U.S. Cl.
CPC .......... *B60C 13/02* (2013.01); *B60C 11/1272* (2013.01); *B60C 13/002* (2013.01); *B60C 2200/04* (2013.01); *B60C 2200/14* (2013.01)

(58) Field of Classification Search
CPC ....... B60C 13/002; B60C 13/02; B60C 13/00; B60C 11/01
See application file for complete search history.

(56) References Cited

U.S. PATENT DOCUMENTS

2019/0299719 A1   10/2019 Murata

FOREIGN PATENT DOCUMENTS

| JP | 2016159664 A | * | 9/2016 | |
| JP | 2017124733 A | * | 7/2017 | ............. B60C 11/01 |
| JP | 2017-213925 A | | 12/2017 | |

OTHER PUBLICATIONS

Murata, English Machine Translation of JP 2016159664, 2016 (Year: 2016).*
Yamakawa, English Machine Translation of JP 2017124733, 2017 (Year: 2017).*

* cited by examiner

*Primary Examiner* — Robert C Dye
*Assistant Examiner* — Brendon Charles Darby
(74) *Attorney, Agent, or Firm* — Greenblum & Bernstein, P.L.C.

(57) ABSTRACT

A pneumatic tire includes a tread portion and a pair of sidewall portions each extending inwardly in a tire radial direction from the tread portion. At least one of the pair of the sidewall portions is provided with at least one side protector protruding outwardly in a tire axial direction. The side protector is provided with a groove, a cut-out portion connected with the groove, and a sipe connected with the groove.

20 Claims, 5 Drawing Sheets

PNEUMATIC TIRE

TECHNICAL FIELD

The present invention relates to a pneumatic tire having side protectors.

BACKGROUND ART

Patent Document 1 shown below has described a pneumatic tire for running on an unpaved road in which side blocks are provided in a sidewall portion. The side blocks are arranged in a tire circumferential direction, and are connected continuously by raised portions provided in lateral grooves extending between a tread portion and the sidewall portion. Each of the raised portions is provided with a first narrow groove and a cut-out portion extending in a tire width direction.

PRIOR ART DOCUMENT

Patent Document

[Patent Document 1]
Japanese Unexamined Patent Application Publication No. 2017-213925

SUMMARY OF THE INVENTION

Problems to be Solved by the Invention

In the pneumatic tire of the above Patent Document 1, there is room for improvement in increasing off-road performance while maintaining cut resistant performance of the sidewall portion.

The present invention was made in view of the above, and a primary object thereof is to provide a pneumatic tire capable of improving the off-road performance while maintaining the cut resistant performance of the sidewall portion.

Means for Solving the Problems

The present invention is a pneumatic tire including a tread portion and a pair of sidewall portions each extending inwardly in a tire radial direction from the tread portion, wherein at least one of the pair of the sidewall portions is provided with at least one side protector protruding outwardly in a tire axial direction, and the side protector is provided with a groove, a cut-out portion connected with the groove, and a sipe connected with the groove.

In the tire according to the present invention, it is preferred that the cut-out portion extends in a width direction of the groove.

In the tire according to the present invention, it is preferred that a width of the groove is 10% or more and 40% or less of a length in a tire circumferential direction of the side protector.

In the tire according to the present invention, it is preferred that the side protector is divided by the groove into a first protector portion and a second protector portion having a surface area smaller than the first protector portion.

In the tire according to the present invention, it is preferred that a distance in the tire radial direction between the cut-out portion and a tread edge is 25% or more and 40% or less of the tire section height.

In the tire according to the present invention, it is preferred that in a front view of the at least one sidewall portion, the sipe includes a first portion and a second portion which is bent with respect to the first portion.

In the tire according to the present invention, it is preferred that the first portion extends linearly along the tire radial direction, and the second portion extends linearly at an angle different from that of the first portion with respect to the tire radial direction.

In the tire according to the present invention, it is preferred that the sipe and the cut-out portion face each other with the groove therebetween.

In the tire according to the present invention, it is preferred that in a front view of the at least one sidewall portion, the groove includes a first groove portion and a second groove portion that is bent with respect to the first groove portion.

In the tire according to the present invention, it is preferred that the first groove portion extends along the tire radial direction, and the second groove portion is inclined with respect to the tire radial direction.

In the tire according to the present invention, it is preferred that the first groove portion is arranged radially outside the second groove portion.

Effects of the Invention

The side protector of the pneumatic tire according to the present invention is provided with the groove, the cut-out portion connected with the groove, and the sipe connected with the groove.

The cut-out portion and the sipe configured as such moderate rigidity of the side protector around the groove, therefore, the side protector becomes easy to deform, thereby, envelope characteristics are increased. As a result, the groove can effectively catch mud and the like, therefore, the off-road performance is improved.

Further, the cut-out portion increases surface area of the side protector and increases shearing force against mud and the like, thereby, the off-road performance is further improved.

Furthermore, the sipe suppresses the decrease in the volume of the side protector while improving the envelope characteristics, therefore, the cut resistant performance is maintained high.

Thereby, the pneumatic tire according to the present invention exerts excellent off-road performance while maintaining the cut resistant performance.

MODE FOR CARRYING OUT THE INVENTION

An embodiment of the present invention will now be described in conjunction with accompanying drawings.

Figure 1:
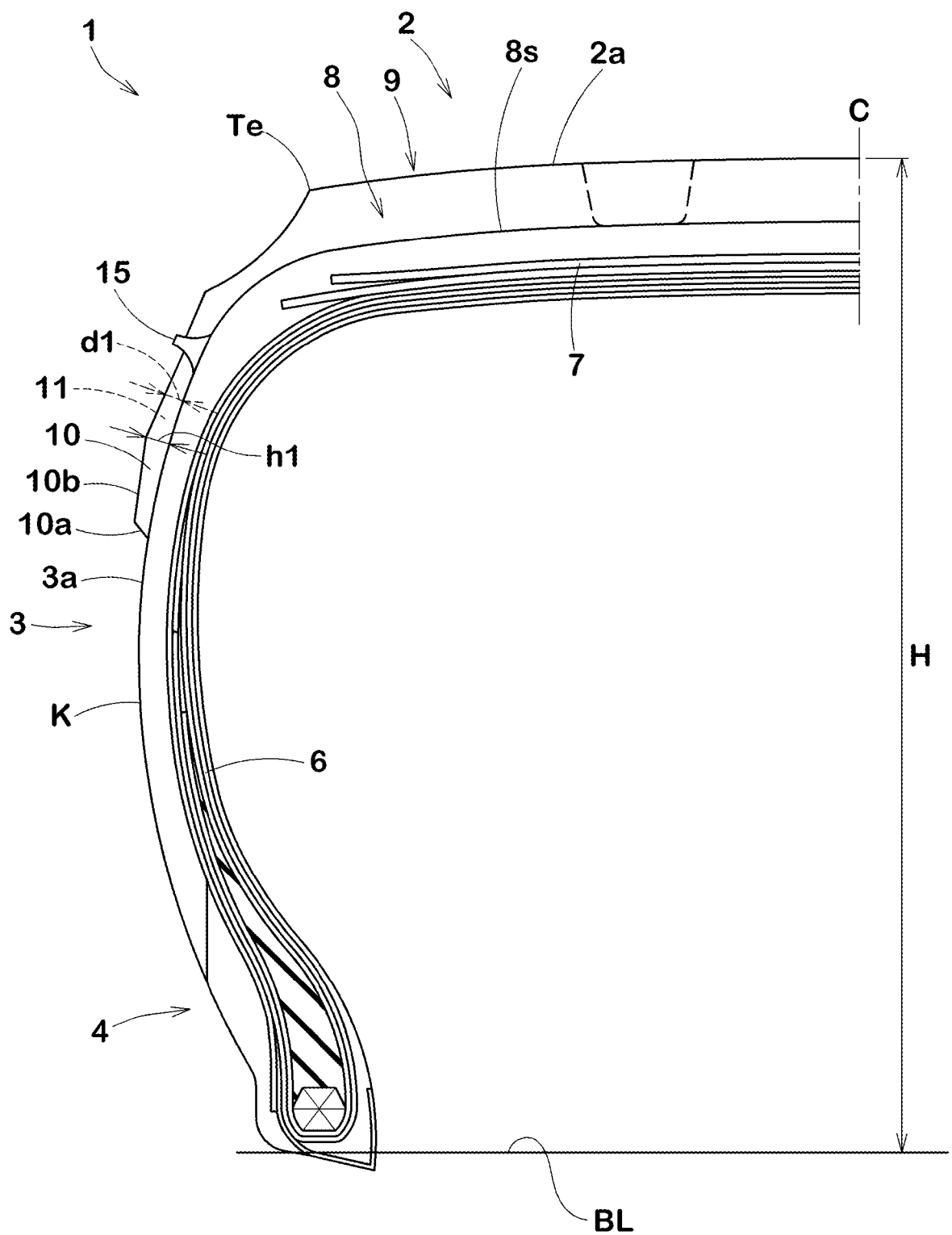
FIG. 1 a tire meridian section showing a left half of a tire according to an embodiment of the present invention.

FIG. 1 is a tire meridian section passing through a tire rotational axis (not shown) of a pneumatic tire (hereinafter, may be simply referred to as "tire") 1 showing an embodiment of the present invention in a standard state. FIG. 1 shows, as a preferred embodiment, the tire 1 for a passenger car that is suitably mounted on a 4WD car or the like that can run on an uneven road surface such as muddy roads or rocky terrain. However, the present invention can also be applied to the tire 1 of other categories including a tire for light trucks and for heavy loads, for example.

The "standard state" is a state in which the tire 1 is mounted on a standard rim (not shown), inflated to a standard inner pressure, and loaded with no tire load. Dimensions and the like of various parts of the tire are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The tire 1 includes a tread portion 2 having a ground contacting surface (2a) which comes into contact with a road surface, a pair of sidewall portions 3 (one of which is not shown) extending from the tread portion 2 inwardly in a tire radial direction, and bead portions 4 each arranged radially inside a respective one of the sidewall portions 3, for example.

In the present embodiment, tire components including a carcass 6 extending between the bead portions 4 via the tread portion 2 and the sidewall portions 3 and a belt layer 7 disposed in the tread portion 2 are arranged inside the tire 1. Known components are appropriately used for these tire components.

At least one of the pair of the sidewall portions 3 is formed with side protectors 10 that protrude outward in a tire axial direction. The side protectors 10 in the present embodiment are provided on both of the sidewall portions 3.

Figure 2:
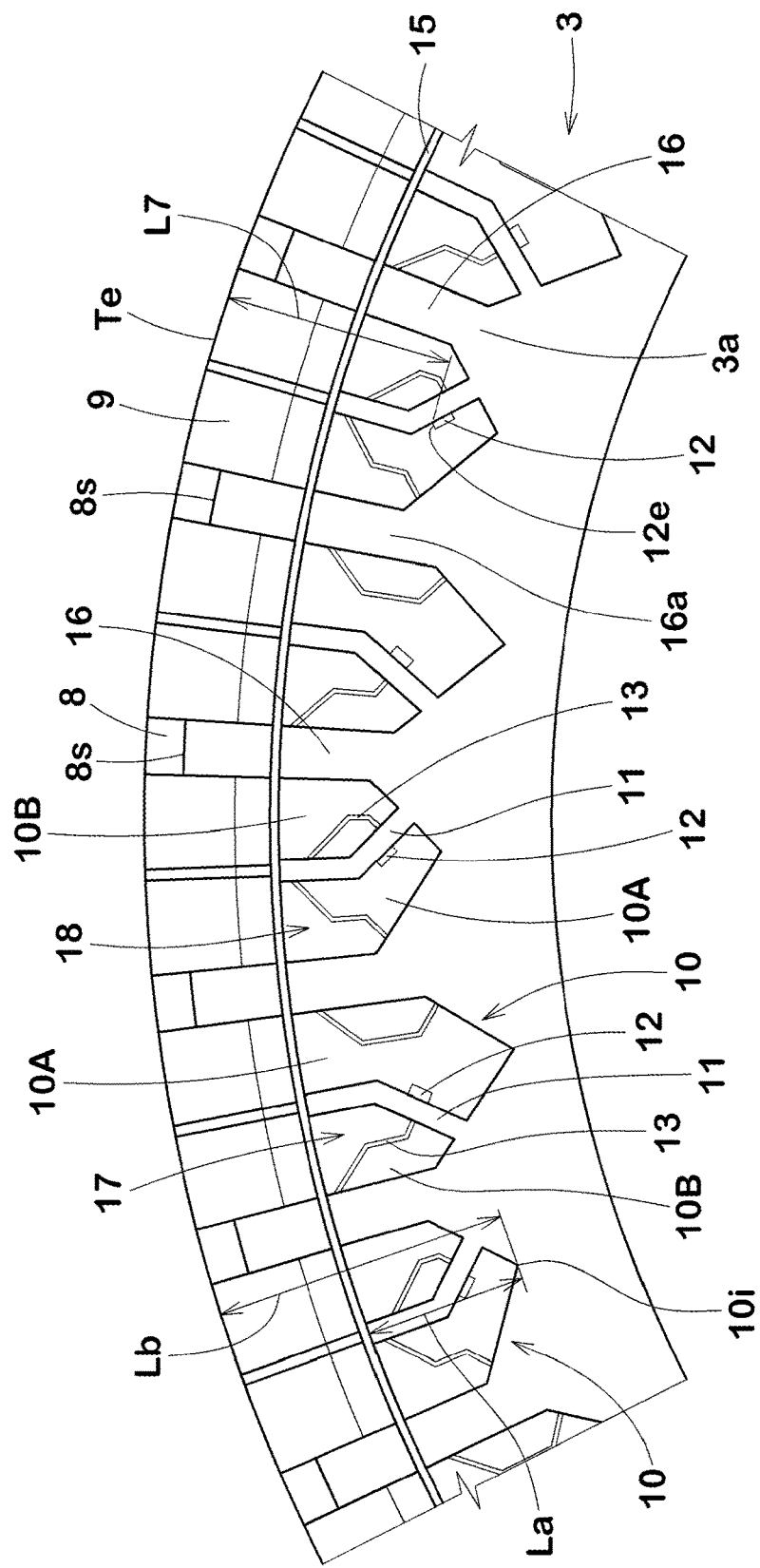
FIG. 2 a front view of a sidewall portion of FIG. 1.

FIG. 2 is a front view of one of the sidewall portions 3. As shown in FIG. 2, the side protectors 10 of the present embodiment are provided with grooves 11, cut-out portions 12 each connected to a respective one of the grooves 11, and sipes 13 each connected to a respective one of the grooves 11. The cut-out portions 12 and the sipes 13 increase envelope characteristics around the grooves 11 by moderating the rigidity of the side protectors 10 so as to make it easy for them to deform. Thereby, the grooves 11 can effectively catch mud and the like, therefore, the off-road performance is improved. Further, the cut-out portions 12 increase surface area of the side protectors 10 and increase shearing force against mud and the like, thereby, the off-road performance is further improved. Furthermore, since the sipes 13 suppress the decrease in the volume of the side protectors 10 while improving the envelope characteristics, the cut resistant performance is maintained at a high level. Therefore, the tire 1 of the present embodiment exerts excellent off-road performance while maintaining the cut resistant performance. Good "cut resistant performance" means that cut damage of the sidewall portions 3 caused during running on rocky terrain or the like is suppressed.

As shown in FIG. 1, in the present embodiment, the side protectors 10 include side wall surfaces (10a) extending axially outwardly from an outer surface (3a) of each of the sidewall portions 3, and outward surfaces (10b) each connected with an axially outer edge of a respective one of the side wall surfaces (10a). Radially outer ends of the side wall surfaces (10a) and the outward surfaces (10b) are connected to a ridge portion 15 projecting outward in the tire axial direction, for example. The outer surface (3a) means a reference surface (K) of the sidewall portion 3 extending smoothly and radially inwardly from groove bottoms (8s) of tread grooves 8 axially extending in and out of tread edges (Te) in the standard state, for example. The reference surface (K) excludes local protrusions including embossed marks such as the ridge portion 15 and marks, and uneven patterns, for example. Note that the outer ends of the side protectors 10 are not limited to the ones connected to the ridge portion 15, and may be ones connected to the outer surfaces (3a), for example.

The "tread edges (Te)" mean axially outermost ground contacting positions of the tire 1 when the tire 1 in the standard state is in contact with a flat surface with zero camber angle by being loaded with a standard tire load.

The "standard tire load" is a tire load specified for the concerned tire by a standard included in a standardization system on which the tire is based, the "maximum load capacity" in JATMA, maximum value listed in "TIRE LOAD LIMITS AT VARIOUS COLD INFLATION PRESSURES" table in TRA, and "LOAD CAPACITY" in ETRTO.

In the present embodiment, the ridge portion 15 extends continuously and annularly in a tire circumferential direction. Further, in the ridge portion 15 of the present embodiment, an axially outer surface (15a) (shown in FIG. 3) protrudes so as to reach axially outside the outward surfaces (10b). A radial width (wa) of the outer surface (15a) is smaller than each of widths (w1) of the grooves 11, for example. It should be noted that the ridge portion 15 may protrude so as to be kept axially inside the outward surfaces (10b).

As shown in FIG. 2, shoulder blocks 9 in which tread edges (Te) are formed are connected to the ridge portion 15 in the present embodiment. The shoulder blocks 9 are connected to the side protectors 10 via the ridge portion 15 in the present embodiment. Further, in the present embodiment, each of the tread grooves 8 is connected to a concave ridge portion 16 formed between the side protectors 10 adjacent to each other in the tire circumferential direction via the ridge portion 15. Bottom surfaces (16a) of the concave ridge portions 16 match the outer surface (3a) of corresponding one of the sidewall portions 3.

Each of the side protectors 10 is divided by a respective one of the grooves 11 into a first protector portion (10A) and a second protector portion (10B) having a smaller surface area than the first protector portion (10A). Since the first protector portion (10A) and the second protector portion (10B) configured as such have different rigidity, the protector portions (10A) and (10B) have different deformations during running. The side protectors 10 configured as such have high envelope characteristics, therefore, the grooves 11 can effectively catch mud and the like, thereby, the off-road performance is improved. The "surface area" mentioned above is the area of the outward surface (10b), and does not include opening portions of the cut-out portion 12 and the sipe 13.

In the front view of each of the sidewall portions 3, the side protectors 10 in the present embodiment are each formed in a pentagonal shape tapered inwardly in the tire radial direction. The side protectors 10 configured as such maintain a high rigidity in the radially outer part which is likely to come into contact with mud, therefore, high shearing force is exerted. It should be noted that the side protectors 10 are not limited to the pentagonal shape, but various shapes including a triangular shape and a quadrangular shape may be adopted.

It is preferred that each of radial lengths (La) of the side protectors 10 is 15% or more and 30% or less of a tire section height (H) (shown in FIG. 1), for example. It is preferred that each of radial distances (Lb) between radially inner ends (10i) of the side protectors 10 and a corresponding one of the tread edges (Te) is 40% or more and 50% or less of the tire section height (H). The tire section height (H) is a length in the tire radial direction between a bead baseline (BL) and a radially outer end of the tire 1.

The side protectors 10 include first side protectors 17 and second side protectors 18 having a different surface shape from the first side protectors 17. The first side protectors 17 are each formed to have a larger radial length (La) than the second side protectors 18. Since the first side protectors 17 and the second side protectors 18 configured as such have different rigidities, the concave ridge portions 16 can effectively catch mud and the like.

In the present embodiment, the first side protectors 17 and the second side protectors 18 are provided alternately in the tire circumferential direction. Thereby, the above-described effect is effectively exerted.

Figure 3:
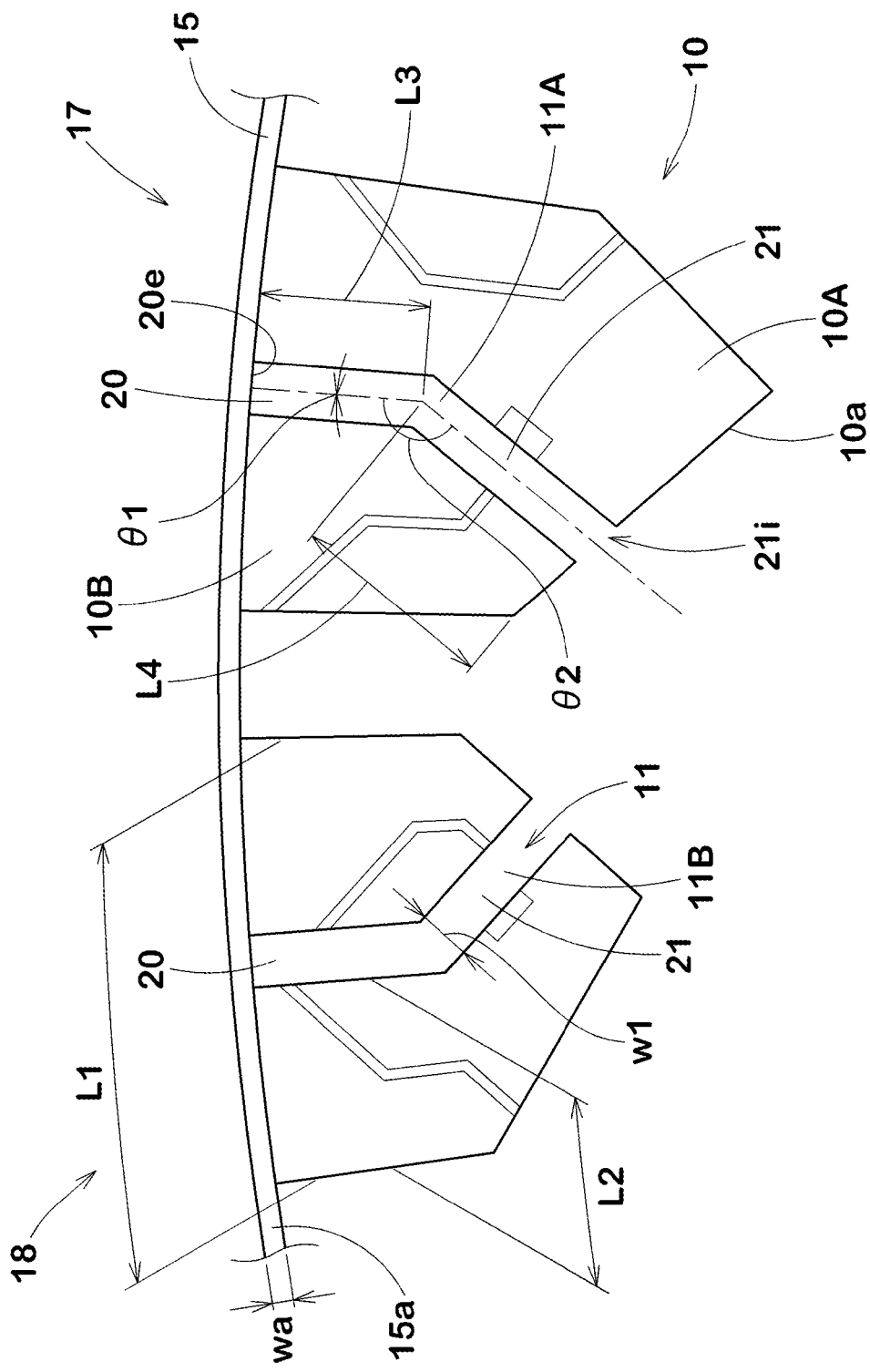
FIG. 3 an enlarged view of side protectors of FIG. 2.

FIG. 3 is an enlarged view of the side protectors 10 of FIG. 2. As shown in FIG. 3, each of the grooves 11 in the present embodiment includes a first groove portion 20 and a second groove portion 21 that is bent with respect to the first groove portion 20. The first groove portion 20 is connected with the second groove portion 21, for example. In each of the side protectors 10, the groove 11 configured as such moderates the rigidity of the side protector 10 in a part where the first groove portion 20 and the second groove portion 21 intersect, therefore, the envelope characteristics are improved. Further, the grooves 11 of the present embodiment include edge components in the tire circumferential direction and the edge components in the tire radial direction, therefore, the shearing force against mud during driving or braking is increased.

The first groove portions 20 extend along the tire radial direction, for example. The first groove portions 20 configured as such increase the edge components in the tire radial direction of the side protectors 10, therefore, the off-road performance is improved. The second groove portions 21 are inclined with respect to the tire radial direction, for example. The second groove portions 21 configured as such exert large shearing force during either braking or driving. The expression "along the tire radial direction" includes not only the case where each of angles θ1 of the first groove portions 20 with respect to the tire radial direction is zero degrees, but also the case where each of the angles θ1 is 20 degrees or less.

In each of the side protectors 10 in the present embodiment, the first groove portion 20 is arranged radially outside the second groove portion 21. As described above, in the present embodiment, the first groove portions 20 extending along the tire radial direction are arranged at positions where the first groove portions 20 are more likely to come into contact with mud than the second groove portions 21. Thereby, the edge components in the tire radial direction largely act on a muddy road, therefore, high shearing force is exerted.

Radially outer ends (20e) of the first groove portions 20 are connected to the ridge portion 15, for example. Radially inner ends (21i) of the second groove portions 21 are connected to the side wall surfaces (10a) of the side protectors 10 so as to have openings there, for example. As described above, in each of the side protectors 10 in the present embodiment, the first protector portion (10A) and the second protector portion (10B) are arranged so as to be apart from each other in the tire circumferential direction.

In each of the side protectors 10, the first groove portion 20 is arranged in a central portion in the tire circumferential direction of the side protector 10, for example. The first groove portions 20 configured as such suppress an excessive decrease in the rigidity of the first protector portions (10A) and the second protector portions (10B). The "central portion" means that it is located at a position where a distance (L2) in the tire circumferential direction between one end in the tire circumferential direction of the side protector 10 and the first groove portion 20 is 30% or more and 70% or less of a length (L1) in the tire circumferential direction of the side protector 10.

The first groove portion 20 is formed to have a length (L3) in a longitudinal direction thereof smaller than a length (L4) in a longitudinal direction of the second groove portion 21 (groove center line (21c)), for example. The grooves 11 configured as such have large edge components in the tire circumferential direction, therefore, the shearing force during driving and braking is increased.

In each of the side protectors 10, it is preferred that an intersection angle θ2 between the first groove portion 20 and the second groove portion 21 is 110 degrees or more and 160 degrees or less, for example. When the intersection angle θ2 is less than 110 degrees, the second groove portion 21 extends in the tire circumferential direction, therefore, it is possible that the shearing force of the second groove portion 21 is decreased. When the intersection angle θ2 is larger than 160 degrees, it is possible that the envelope characteristics of the side protector 10 is decreased. Further, the edge components in the tire circumferential direction of the second groove portion 21 are decreased, therefore, it is possible that the shearing force against mud during driving or braking is decreased.

The grooves 11 include first grooves 11A and second grooves 11B, for example. The first grooves 11A are the grooves 11 in which the second groove portions 21 are inclined to a first side (left side in the figure) as they go radially inwardly, for example. The second grooves 11B are the grooves 11 in which the second groove portions 21 are inclined to a second side (right side in the figure) as they go radially inwardly, for example. The grooves 11 configured as such effectively increase the shearing force during driving and braking.

The first grooves 11A are each provided in a respective one of the first side protectors 17 in the present embodiment. The second grooves 11B are each provided in a respective one of the second side protectors 18 in the present embodiment. As just described, the first grooves 11A and the second grooves 11B are alternately provided in the tire circumferential direction in the present embodiment. Thereby, the effects described above are exerted effectively.

It is preferred that each of the widths (w1) of the grooves 11 is 10% or more and 40% or less of each of the lengths (L1) in the tire circumferential direction of the side protectors 10. The grooves 11 configured as such effectively shear mud. If the widths (w1) of the grooves 11 are small, it is possible that the grooves 11 cannot grasp mud. If the widths (w1) of the grooves 11 are large, the rigidity of the side protectors 10 becomes excessively small, therefore, it is possible that the mud cannot be sheared. From such a point of view, it is preferred that each of the widths (w1) of the grooves 11 is 20% or more and 30% or less of the length (L1) in the tire circumferential direction of the side protectors 10.

Depths (d1) (shown in FIG. 1) of the grooves 11 are not particularly limited, but it is preferred that each of the depths (d1) is 50% or more and 80% or less of each of raised heights (h1) of the side protectors 10. Each of the raised heights (h1) of the side protectors 10 is, in this specification, a length in the respective normal direction from the reference surface (K).

Figure 4:
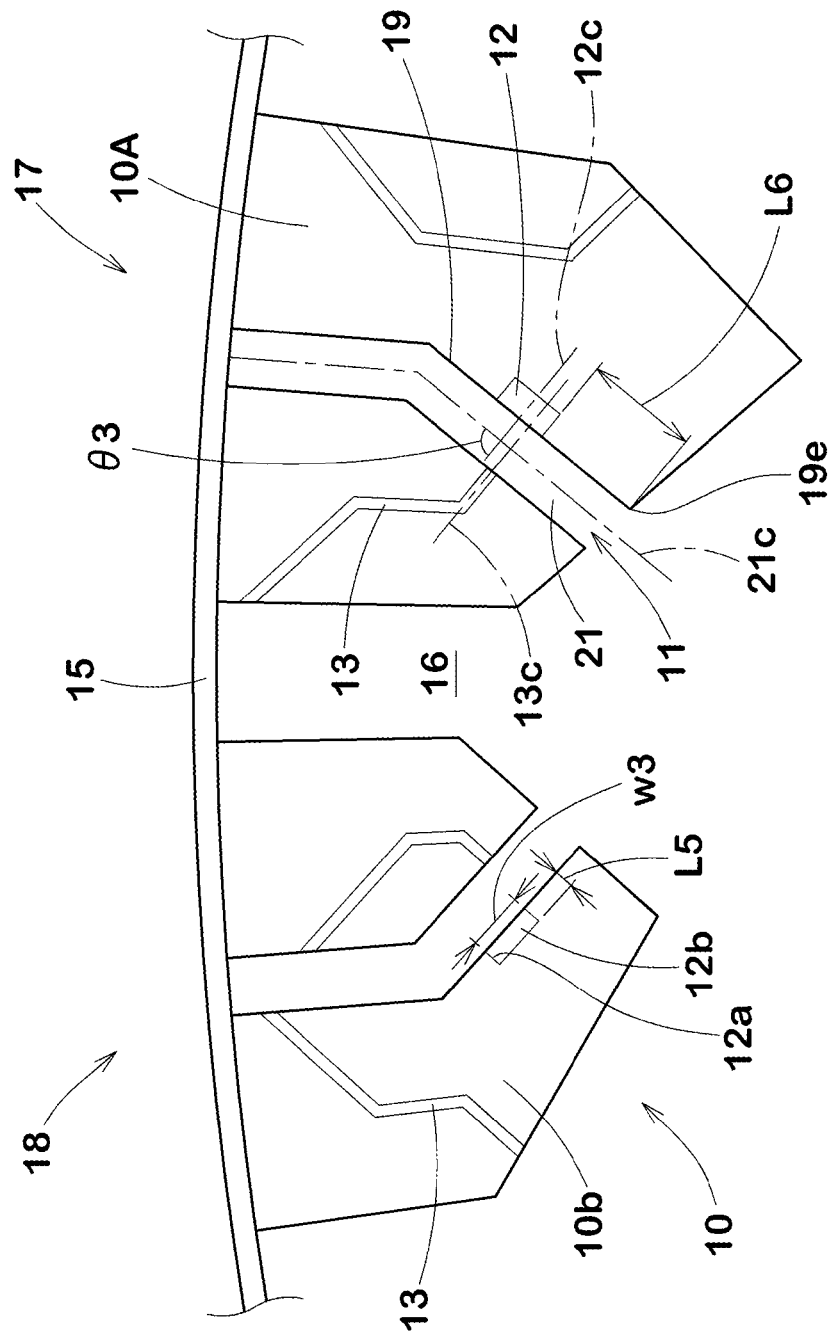
FIG. 4 an enlarged view of the side protectors of FIG. 2.

FIG. 4 is an enlarged view of the side protectors 10. As shown in FIG. 4, in each of the side protectors 10, the cut-out portion 12 and the sipe 13 face each other via the groove 11, i.e., with the groove 11 therebetween, in the present embodiment. Thereby, the rigidity of the side protector 10 around the cut-out portion 12 and the sipe 13 is further decreased, therefore, excellent envelope characteristics are exerted. The above expression "face each other" means an embodiment in which a virtual line (13c) obtained by smoothly extending the sipe 13 (center line) toward the cut-out portion 12 intersects with the cut-out portion 12.

The cut-out portion 12 is connected to the second groove portion 21, for example. The cut-out portions 12 configured as such increase the shearing force against mud and the like during driving and braking.

In this embodiment, in each of the side protectors 10, the cut-out portion 12 extends in a width direction of the groove 11, that is, the cut-out portion 12 is concave in the width direction of the groove 11. The cut-out portion 12 configured as such locally increases the groove width of the groove 11 and can smoothly discharge mud in the cut-out portion 12 to the groove 11. The "width direction" includes not only the case in which an intersection angle θ3 between a center line (12c) of the cut-out portion 12 and the groove center line (21c) of the second groove portion 21 is 90 degrees, but also the case in which the intersection angle θ3 is 70 degrees or more.

The cut-out portions 12 are each defined as a cut in which an opening width (w3) along a longitudinal direction of the groove 11 is larger than a length (depth, i.e., concavity length) L5 along the width direction of the groove 11 in this specification, and they are distinguished from a groove in which its longitudinal length is larger than its width.

Each of the cut-out portions 12 is formed in a rectangular shape when viewed from the front of the sidewall portion 3. The cut-out portions 12 configured as such can increase the shearing force against the mud and the like, and also can smoothly discharge the mud in the cut-out portions 12 to the grooves 11. It should be noted that the cut-out portions 12 are not limited to a rectangular shape, but also include various embodiments such as a semicircular shape, a triangular shape, and a trapezoidal shape and the like, for example.

Each of the cut-out portions 12 in the present embodiment includes inner wall surfaces (12a) extending axially inwardly from the outward surface (10b), and a bottom surface (12b) connecting axially inner ends of the inner wall surfaces (12a). The bottom surface (12b) is provided axially outside the outer surface (3a), for example. The cut-out portions 12 configured as such smoothly discharge mud in the cut-out portions 12. It should be noted that the bottom surfaces (12b) may be provided at the same axial position as the outer surface (3a), for example.

The cut-out portions 12 are provided in the first protector portions (10A) which have large surface areas, for example. Thereby, the rigidity of the first protector portions (10A) having large rigidity is appropriately moderated, therefore, the deformation of the first protector portions (10A) is increased.

In each of the side protectors 10, the cut-out portion 12 is provided at a central portion in the longitudinal direction of the second groove portion 21, for example. The cut-out portions 12 configured as such suppress excessive moderation of the rigidity of the first protector portions (10A) around the second groove portions 21. The central portion of the second groove portion 21 means that a length (L6) between one end (19e) of a groove edge 19 on the side where the cut-out portions 12 of the second groove portion 21 is provided and the cut-out portion 12 is 35% or more and 65% or less of the length (L4) of the second groove portion 21.

As shown in FIG. 2, it is preferred that a distance (L7) between a radially outer end (12e) of each of the cut-out portions 12 and the tread edge (Te) is 25% or more and 40% or less of the tire section height (H). By providing the cut-out portions 12 at such positions, the shearing force on a muddy road is appropriately increased.

As shown in FIG. 4, it is preferred that each of the opening widths (w3) of the cut-out portions 12 is 80% or more and 180% or less of each of the widths (w1) of the grooves 11, for example. It is preferred that each of the lengths (L5) of the cut-out portions 12 is 30% or more and 80% or less of each of the opening widths (w3), for example.

Figure 5:
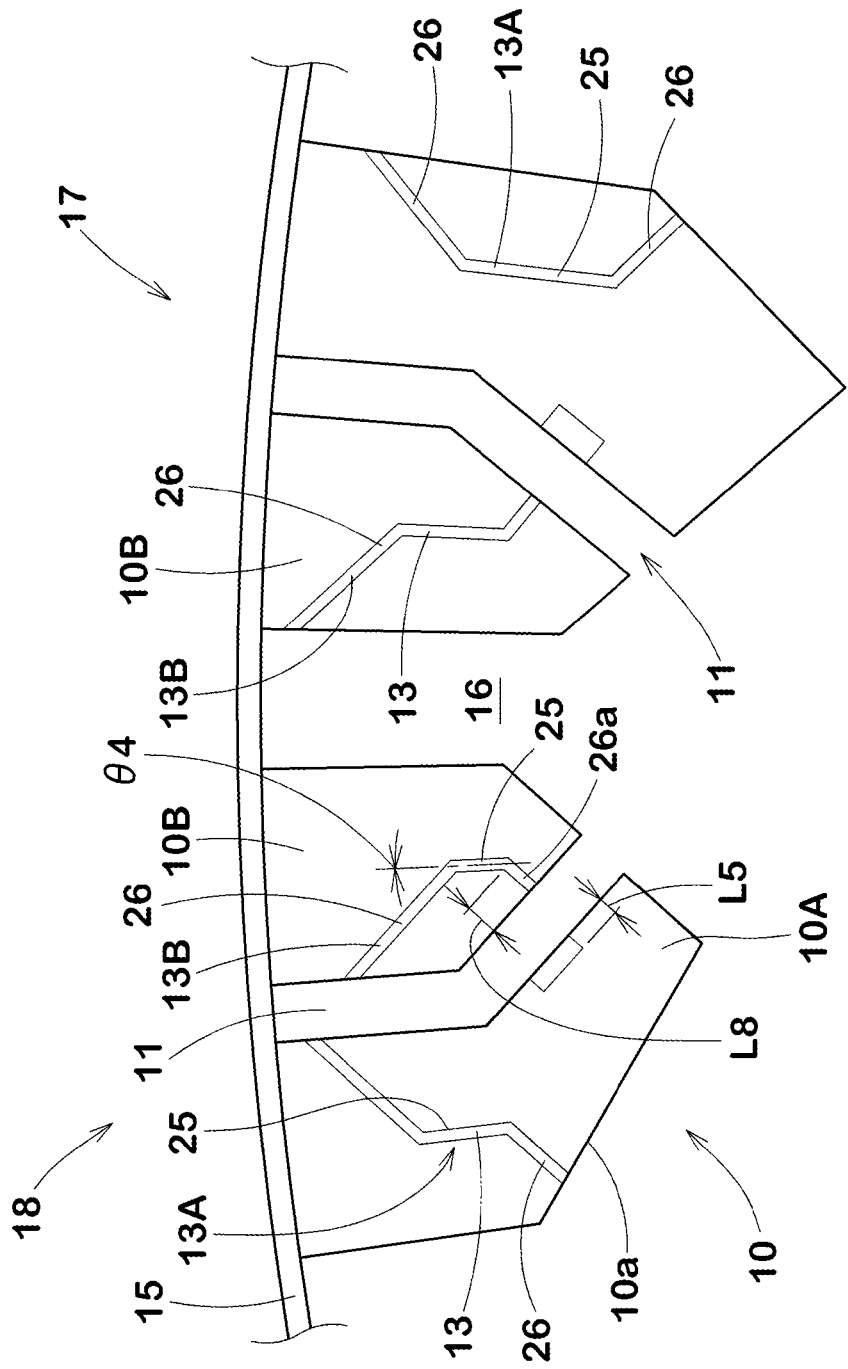
FIG. 5 an enlarged view of the side protectors of FIG. 2.

FIG. 5 is an enlarged view of the side protectors 10. As shown in FIG. 5, each of the sipes 13 includes a first portion 25 and second portions 26 each of which is bent with respect to the first portion 25, for example. In each of the side protectors 10, the sipe 13 configured as such remarkably moderates the rigidity of the side protector 10 at a part where the first portion 25 and the second portions 26 intersect, therefore, the envelope characteristics are improved. Each of the sipes 13 of the present embodiment is formed by the first portion 25 and a pair of the second portions 26 connected to both ends of the first portion 25. The sipes 13 configured as such effectively exert the above-described effects.

The first portion 25 extends linearly along the tire radial direction, for example. The first portions 25 configured as such increase the edge components in the tire radial direction of the side protectors 10, therefore, the off-road performance is improved. The expression "along the tire radial direction" includes not only the embodiment in which an angle θ4 of the first portion 25 with respect to the tire radial direction is zero degree but also the embodiment in which the angle θ4 is 20 degrees or less. The second portions 26 extend linearly at angles different from that of the first portion 25, for example. The linearly extending first portions 25 and second portions 26 configured as such suppress damage such as chipping, cracks, and the like of the side protectors 10, therefore, the cut resistant performance is maintained high.

One end of each of the second portions 26 arranged on both sides of the first portion 25 in the present embodiment is connected to the side wall surface (10a) of the side protector 10 or the groove 11. In other words, each of the sipes 13 of the present embodiment is of a fully open type that divides the first protector portion (10A) or the second protector portion (10B). The sipes 13 configured as such effectively moderate the rigidity of the side protectors 10.

The second portions 26 include adjacent second portions (26a) which are adjacent closest to the cut-out portions 12. It is preferred that each of lengths (L8) of the adjacent second portions (26a) is 0.5 times or more and 2.0 times or less each of the lengths (L5) of the cut-out portions 12. The adjacent second portions (26a) configured as such moderately decrease the rigidity of the side protectors 10 in parts around the cut-out portions 12, therefore, the off-road performance is improved.

The sipes 13 in the present embodiment include first sipes (13A) formed in the first protector portions (10A) and second sipes (13B) formed in the second protector portions (10B). The sipes 13 configured as such moderate, i.e., decrease, the rigidity of the first protector portions (10A) and the second protector portions (10B) more effectively.

The sipes 13 are each defined in the present specification as an incision having a width of less than 0.8 mm and are distinguished from grooves having a greater width. Further, although not particularly limited, it is preferred that each of depths (not shown) of the sipes 13 is 10% or more and 30% or less of each of the raised heights (h1) of the side protectors 10.

While detailed description has been made of the tire according to an embodiment of the present invention, the sidewall portions. The results are indicated by an evaluation point based on Reference 1 being 100, wherein the larger the numerical value, the better the cut resistant performance is.

Test vehicle: 4WD passenger car with a displacement of 2500 cc

<Off-Road Performance>

The test driver drove the above test vehicle on an off-road test course having the rocky road surface and a muddy road, and evaluated the off-road performance regarding traction and straight running stability.

The results are indicated by an evaluation point based on the Reference 1 being 100, wherein the larger the numerical value, the better the off-road performance is.

The test results are shown in Table 1.

TABLE 1

|  | Ref. 1 | Ref. 2 | Ref. 3 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- | --- | --- |
| Presence (P) or absence (A) of connection between groove and sipe within side protector | A | A | P | P | P | P | P | P | P | P | P |
| Presence (P) or absence (A) of connection between groove and cut-out portion within side protector | A | P | A | P | P | P | P | P | P | P | P |
| Width (w1) of Groove/Length (L1) of Side protector [%] | 20 | 20 | 20 | 20 | 10 | 40 | 5 | 45 | 20 | 20 | 20 |
| Distance (L7)/Tire section height (H) [%] | 30 | 30 | 30 | 30 | 30 | 30 | 30 | 30 | 25 | 40 | 30 |
| Positional relation of Sipe and Cut-out portion | Not facing | Not facing | Not facing | Facing | Facing | Facing | Facing | Facing | Facing | Facing | Not facing |
| Cut resistant performance [Evaluation point: larger numerical value is better] | 100 | 100 | 100 | 105 | 110 | 100 | 110 | 97 | 103 | 107 | 110 |
| Off-road performance [Evaluation point: larger numerical value is better] | 100 | 105 | 105 | 120 | 115 | 125 | 117 | 125 | 120 | 115 | 110 | present invention can be embodied in various forms without being limited to the illustrated embodiment.

Working Examples (Examples)

Pneumatic tires having the basic structure shown in FIG. 1 and including the side protectors shown in FIG. 2 were made by way of test according to the specifications listed in Table 1, and then the test tires were tested for the cut resistant performance and the off-road performance. Common specifications of the test tires and the test methods were as follows. It should be noted that the sipes and the cut-out portions each have the same length and the same volume in Examples and References. "Absence" in "Presence or absence of connection between groove and sipe" in Table 1 means that both ends of all the sipes are open to the side wall surfaces. "Absence" in "Presence or absence of connection between groove and cut-out portion" in Table 1 means that the cut-out portions are open to the side wall surfaces.

Tire size: 35×12.50R20LT
Tire rim: 10.00/8.50
Tire inner pressure: 260 kPa

<Cut Resistant Performance>

The test tires were mounted on all wheels of the following vehicle. And then after a test driver drove the vehicle on a rocky road surface, which includes rocks and rubble, of a test course for about 500 km, the cut resistant performance was comprehensively evaluated based on the depths of the cut damage and the lengths of the cut damage generated in From the test results, it can be confirmed that the tires in the Examples have better performances than the tires in the References.

DESCRIPTION OF REFERENCE SIGNS 1 pneumatic tire
2 tread portion
3 sidewall portion
10 side protector
11 groove
12 cut-out portion
13 sipe

The invention claimed is:

1. A pneumatic tire comprising a tread portion and a pair of sidewall portions each extending inwardly in a tire radial direction from the tread portion, wherein
at least one of the pair of the sidewall portions is provided with at least one side protector protruding outwardly in a tire axial direction from an outer surface of the at least one of the pair of the sidewall portions,
the side protector is provided with a groove, a cut-out portion connected with and concaved from the groove, and a sipe connected with the groove, and
the cut-out portion terminates to have a closed terminating end within the side protector and has an opening width along a longitudinal direction of the groove larger than a length thereof along a concavity direction from the groove.

2. The pneumatic tire according to claim 1, wherein the cut-out portion is concaved in a width direction of the groove.

3. The pneumatic tire according to claim 1, wherein a width of the groove is 10% or more and 40% or less of a length in a tire circumferential direction of the side protector.

4. The pneumatic tire according to claim 1, wherein the side protector is divided by the groove into a first protector portion and a second protector portion having a surface area smaller than the first protector portion.

5. The pneumatic tire according to claim 4, wherein the cut-out portion is provided in the first protector portion.

6. The pneumatic tire according to claim 1, wherein a distance in the tire radial direction between the cut-out portion and a tread edge is 25% or more and 40% or less of the tire section height.

7. The pneumatic tire according to claim 1, wherein in a front view of the at least one sidewall portion, the sipe includes a first portion and a second portion which is bent with respect to the first portion.

8. The pneumatic tire according to claim 7, wherein the first portion extends linearly along the tire radial direction, and
the second portion extends linearly at an angle different from that of the first portion with respect to the tire radial direction.

9. The pneumatic tire according to claim 7, wherein the sipe is formed by the first portion and a pair of the second portions connected to both ends of the first portion.

10. The pneumatic tire according to claim 1, wherein the sipe and the cut-out portion face each other with the groove therebetween.

11. The pneumatic tire according to claim 1, wherein in a front view of the at least one sidewall portion, the groove includes a first groove portion and a second groove portion that is bent with respect to the first groove portion.

12. The pneumatic tire according to claim 11, wherein the first groove portion extends along the tire radial direction, and
the second groove portion is inclined with respect to the tire radial direction.

13. The pneumatic tire according to claim 12, wherein the first groove portion is arranged radially outside the second groove portion.

14. The pneumatic tire according to claim 12, wherein the at least one sidewall portion is provided with a plurality of the side protectors,
the grooves include first grooves and second grooves,
the second groove portions of the first grooves are inclined to a first side with respect to the tire radial direction, and
the second groove portions of the second grooves are inclined to a second side with respect to the tire radial direction.

15. The pneumatic tire according to claim 11, wherein a length in a longitudinal direction of the first groove portion is smaller than a length in a longitudinal direction of the second groove portion.

16. The pneumatic tire according to claim 11, wherein an intersection angle $\theta 2$ between the first groove portion and the second groove portion is 110 degrees or more and 160 degrees or less.

17. The pneumatic tire according to claim 1, wherein a radial length of the side protector is 15% or more and 30% or less of the tire section height.

18. The pneumatic tire according to claim 1, wherein the at least one sidewall portion is provided with a plurality of the side protectors,
the side protectors include first side protectors and second side protectors having different surface shapes from the first side protectors, and
the first side protectors have radial lengths each larger than each of radial lengths of the second side protectors.

19. The pneumatic tire according to claim 18, wherein the first side protectors and the second side protectors are arranged alternately in a tire circumferential direction.

20. The pneumatic tire according to claim 1, wherein the sipe has a width of less than 0.8 mm.

* * * * *